US 8,224,653 B2

(12) United States Patent
De Mers et al.

(10) Patent No.: US 8,224,653 B2
(45) Date of Patent: Jul. 17, 2012

(54) METHOD AND SYSTEM FOR OPERATING A VEHICULAR ELECTRONIC SYSTEM WITH CATEGORIZED VOICE COMMANDS

(75) Inventors: Robert E. De Mers, Nowthen, MN (US); Steven Paul Grothe, Cave Creek, AZ (US); Joseph J. Nutaro, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 802 days.

(21) Appl. No.: 12/340,065

(22) Filed: Dec. 19, 2008

(65) Prior Publication Data
US 2010/0161339 A1      Jun. 24, 2010

(51) Int. Cl.
    *G10L 21/00* (2006.01)
(52) U.S. Cl. ...................................................... 704/275
(58) Field of Classification Search .................. 704/275
    See application file for complete search history.

(56) References Cited

U.S. PATENT DOCUMENTS

| 6,622,121 | B1 | 9/2003 | Crepy et al. |
| 7,421,393 | B1 * | 9/2008 | Di Fabbrizio et al. ........ 704/275 |
| 7,940,914 | B2 * | 5/2011 | Petrushin ................. 379/265.06 |
| 2002/0055844 | A1 * | 5/2002 | L'Esperance et al. ........ 704/260 |
| 2003/0033145 | A1 * | 2/2003 | Petrushin ...................... 704/236 |
| 2006/0015338 | A1 | 1/2006 | Poussin |
| 2006/0085187 | A1 | 4/2006 | Barquilla |
| 2006/0167696 | A1 | 7/2006 | Chaar et al. |
| 2007/0288128 | A1 * | 12/2007 | Komer et al. ...................... 701/3 |

FOREIGN PATENT DOCUMENTS

FR          2844911 A1       9/2002

OTHER PUBLICATIONS

EP Search Report, EP 11159469.3-1224 dated Apr. 21, 2011.
European Patent Office "Supplementary European Search Report," mailed Sep. 16, 2010.
EP Search Report, EP 09177962.9 dated Mar. 16, 2010.
European Search Authority, European Office Action for Application No. 09177962.9, dated Sep. 19, 2011.

* cited by examiner

*Primary Examiner* — Michael N Opsasnick
(74) *Attorney, Agent, or Firm* — Ingrassia Fisher & Lorenz, P.C.

(57) ABSTRACT

Methods and systems for operating an avionics system with voice command capability are provided. A first voice command is received. A first type of avionics system function is performed in response to the receiving of the first voice command. A second voice command is received. A second type of avionics system function that has a hazard level higher than that of the first type of avionics system function is performed in response to the receiving of the second voice command only after a condition is detected that is indicative of a confirmation of the request to perform the second type of avionics function. The avionics system may also have the capability to test whether or not the voice command feature is functioning properly.

18 Claims, 2 Drawing Sheets

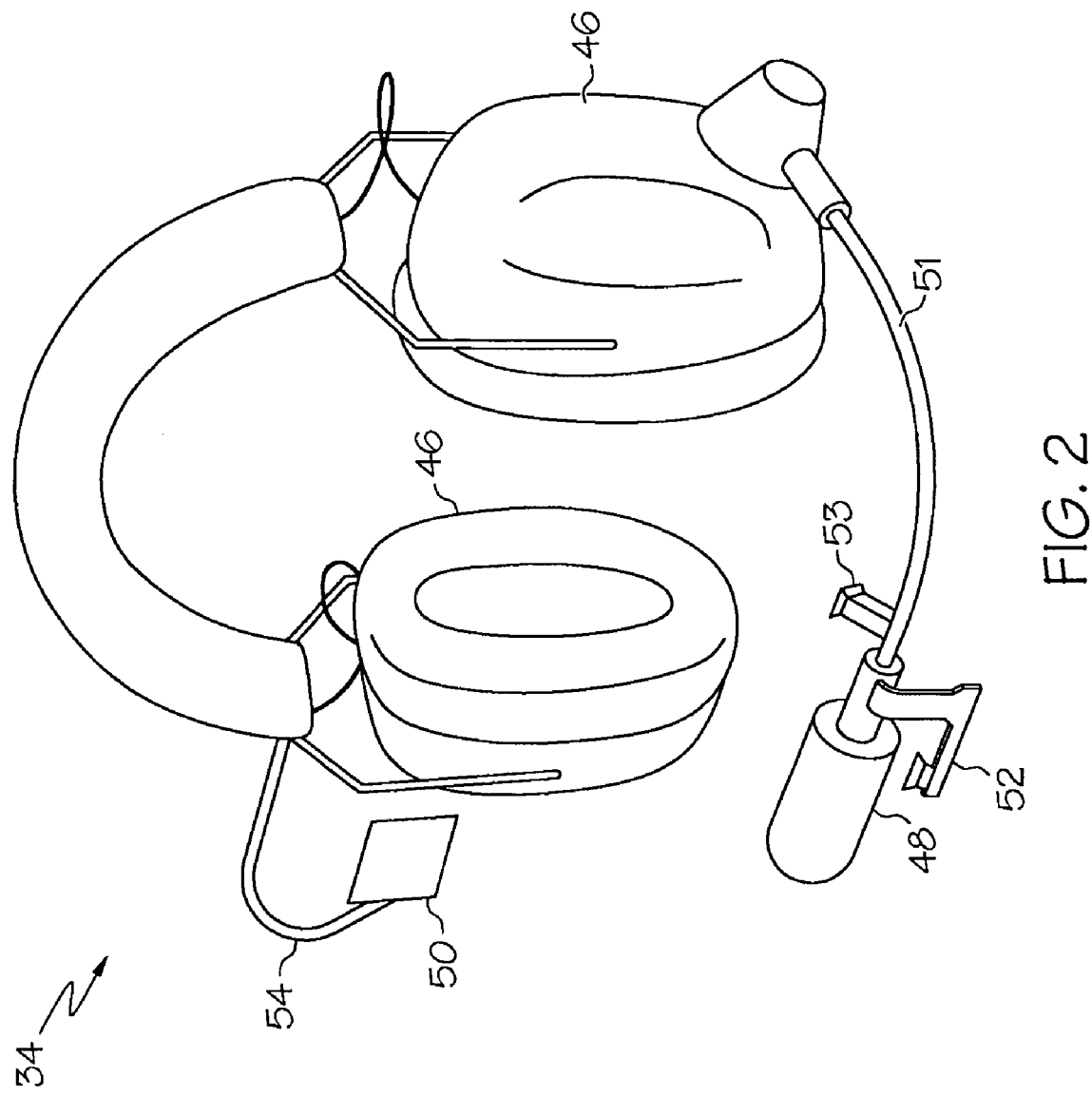

METHOD AND SYSTEM FOR OPERATING A VEHICULAR ELECTRONIC SYSTEM WITH CATEGORIZED VOICE COMMANDS

TECHNICAL FIELD

The present invention generally relates to control systems with voice command capability, and more particularly relates to methods and systems for operating a vehicular electronic system with voice command capability

BACKGROUND

In recent years, aircraft control systems (e.g., avionics systems) have becoming increasingly electronic and integrated with on-board computers. When combined with recent advances in voice recognition software, it now seems feasible that voice commands may soon been used to control various avionics systems functions.

However, modern voice recognition software in and of itself, may not be able address the varying levels of hardware and software criticality or the flight crew procedures currently implemented by regulatory authorities that are designed to prevent errors in input control. For example, flight crews are often trained in procedures for entering avionics systems commands that involve one pilot speaking the next intended command and the other pilot confirming that the command is correct. Further, modern safety standards for software used in avionics systems (such as the DO-178B protocol) requires extremely high reliability for software functions involving critical (e.g., high hazard level) functions (such as a $1.0 \times 10^{-9}$ probability of failure).

Accordingly, it is desirable to provide a method and system for operating an avionics system having voice command capability that differentiates between the hazard levels of various avionics systems functions, allows the flight crew to interact in a manner consistent with modern flight deck procedures, and is capable of meeting the safety requirements of regulatory authorities. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, a method for operating an avionics system is provided. A first voice command indicative of a request to perform a first type of avionics system function is received. The first type of avionics system function is performed in response to the receiving of the first voice command. A second voice command indicative of a request to perform a second type of avionics system function is received. The second type of avionics system function has a hazard level that is higher than that of the first type of avionics system function. The second type of avionics system function is performed in response to the receiving of the second voice command only after a condition is detected that is indicative of a confirmation of the request to perform the second type of avionics function.

In another embodiment, an avionics system is provided. The avionics system includes at least one microphone configured to detect voice commands and generate voice command signals representative thereof and a processing system in operable communication with the microphone. The processing system is configured to receive a first voice command signal from the at least one microphone, the first voice command signal being indicative of a request to perform a first type of avionics system function, perform the first type of avionics system function in response to said receiving the first voice command signal, receive a second voice command signal from the at least one microphone, the second voice command signal being indicative of a request to perform a second type of avionics system function, the second type of avionics system function having a hazard level that is higher than that of the first type of avionics system function, and perform the second type of avionics system function in response to said receiving the second voice command only after a condition is detected that is indicative of a confirmation of the request to perform the second type of avionics function.

In a further embodiment, an avionics system is provided. The avionics system includes a speaker configured to generate an artificial voice command, a microphone configured to detect the artificial voice command and generate an artificial voice command signal representative thereof, and a processing system in operable communication with the speaker and the microphone. The processing system is configured to provide the speaker with a test voice command signal such that the speaker generates the artificial voice command, receive the artificial voice command signal from the microphone, and compare the test voice command signal with the artificial voice command signal.

BRIEF DESCRIPTION OF THE DRAWINGS

The present invention will hereinafter be described in conjunction with the following drawing figures, wherein like numerals denote like elements, FIG. 2 is an isometric view of a headset within the aircraft of FIG. 2, according to one embodiment of the present invention.

DETAILED DESCRIPTION

Figure 1:
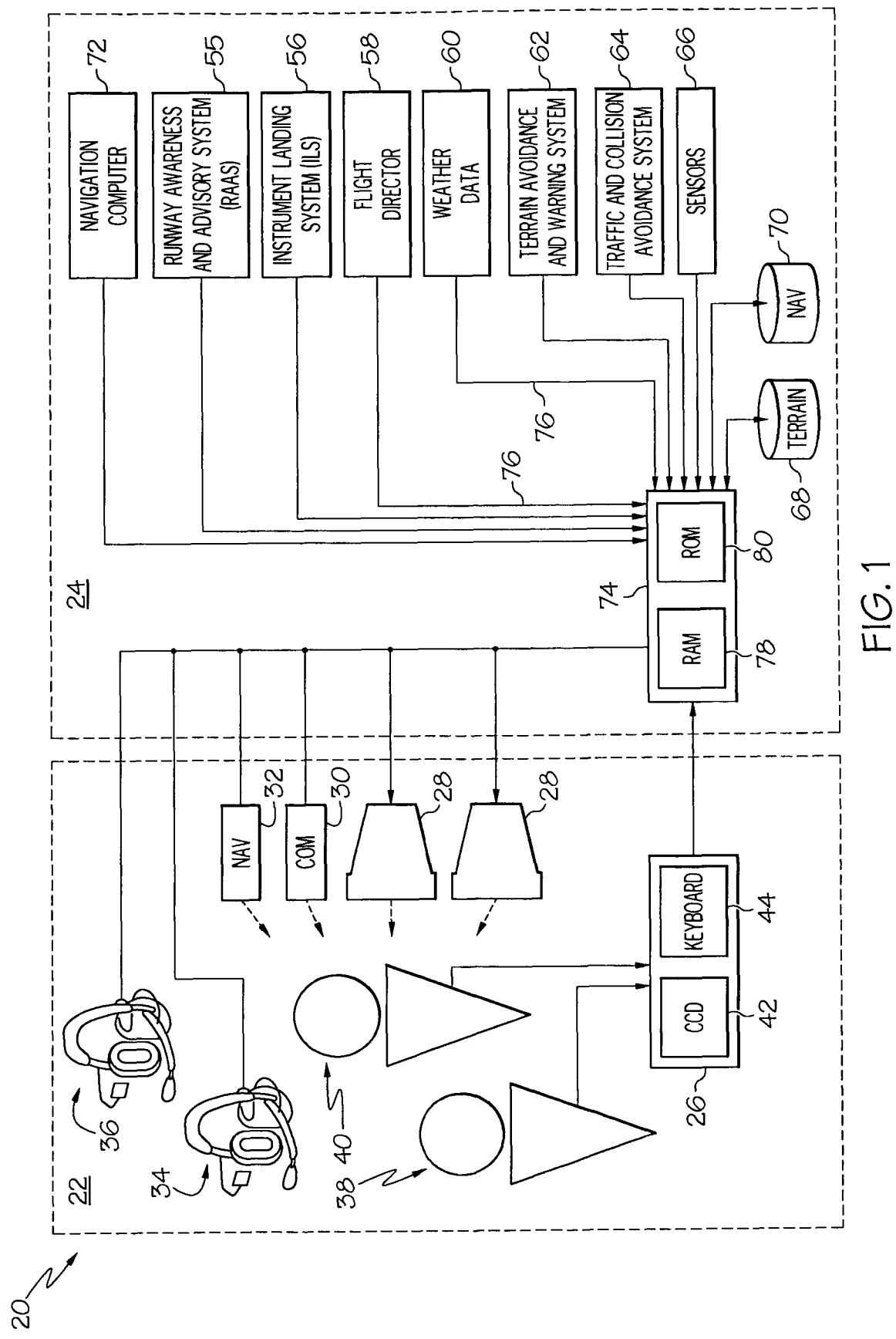
FIG. 1 is a schematic block diagram of an aircraft, according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1 and 2 are merely illustrative and may not be drawn to scale. Additionally, in several of the drawings, a Cartesian coordinate system, including x, y, and z axes and/or directions, is shown to clarify the relative position and/or orientation of the components, according to the various embodiments. However, this coordinate system is only intended to assist in the explanation of various aspects of the present invention, and should be not construed as limiting.

FIG. 1 and FIG. 2 illustrate methods and systems for operating an avionics system having voice command capability. A first voice command indicative of a request to perform a first type of avionics system function is received. The first type of avionics system function is performed in response to the receiving of the first voice command. A second voice command indicative of a request to perform a second type of avionics system function is received. The second type of avionics system function has a hazard level that is higher than that of the first type of avionics system function. The second type of avionics system function is performed in response to the receiving of the second voice command only after a condition is detected that is indicative of a confirmation of the request to perform the second type of avionics function. The confirmation condition may be whether or not an additional, confirmation voice command has been received or related to an operational state of the aircraft. The avionics system may also have the capability to test whether or not the voice command feature is functioning properly.

FIG. 1 schematically illustrates a vehicle 20, such as an aircraft, according to one embodiment of the present invention. The vehicle (or aircraft) 20 may be, in one embodiment, any one of a number of different types of aircraft such as, for example, a private propeller or jet engine driven airplane, a commercial jet liner, a helicopter, or a glider. In the depicted embodiment, the aircraft 20 includes a flight deck 22 (or cockpit) and a flight system 24, which may jointly form an avionics system from at least some of the components and subsystems described below, as is commonly understood. Although not specifically illustrated, it should be understood that the aircraft 20 also includes a frame or body to which the flight deck 22 and the flight system 24 are connected, as is commonly understood. It should also be noted that aircraft 20 is merely exemplary and could be implemented without one or more of the depicted components, systems, and data sources. It will additionally be appreciated that the aircraft 20 could be implemented with one or more additional components, systems, or data sources.

The flight deck 22 includes a user interface 26, display devices 28 (e.g., a primary flight display (PFD)), a communications radio 30, a navigational radio 32, a first headset 34, and a second headset 36.

The user interface 26 is configured to receive input from first and second users 38 and 40 (e.g., a pilot and a co-pilot) and, in response to user input, supply command signals to the avionics system. The user interface 26 may include flight controls (not shown) and any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 26 includes a CCD 42 and a keyboard 44. The users 38 and 40 use the CCD 42 to, for example, move a cursor symbol on the display devices 28, and use the keyboard 44 to, for example, input textual data.

Still referring to FIG. 1, the display devices 28 are used to display various images and data, in graphic, iconic, and/or textual formats, and to supply visual feedback to the users 38 and 40 in response to the user input commands supplied by the users 38 and 40 to the user interface 26. It will be appreciated that the display devices 28 may each be implemented using any one of numerous known displays suitable for rendering image and/or text data in a format viewable by the user 40, such as a cathode ray tube (CRT) displays, a LCD (liquid crystal display), or a TFT (thin film transistor) display. As described below, in some embodiments, at least one of the display devices may include a "touch screen" display device, such as a touch screen LCD. The display devices 28 may also be implemented on the flight deck 22 as "head-down" displays or a head-up display (HUD) projection on a fixed image combiner.

The communication radio 30 is used, as is commonly understood, to communicate with entities outside the aircraft 20, such as air-traffic controllers and pilots of other aircraft. The navigational radio 32 is used to receive from outside sources and communicate to the user various types of information regarding the location of the vehicle, such as Global Positioning Satellite (GPS) system and Automatic Direction Finder (ADF) (as described below).

FIG. 2 illustrates the first headset 34 (or the second headset 36) in greater detail. The headset 36 includes an interconnected combination of earphones 46, a microphone 48, and a near-to-eye (NTE) display (or display screen) 50. The earphones 46 may include a set of speakers (not shown) and substantially form a frame for the headset 36 and be configured to be removably worn by, for example, either of the users 38 and 40. The microphone 48 is connected to the earphones 46 by a microphone arm 51. In one embodiment, the headset 36 also includes a test speaker 52 and a test camera 53 connected to the microphone arm 51 near the microphone 48. In the depicted embodiment, the test speaker 52 is positioned on a side of the microphone 48 opposite the conventional position of the respective user's head (not shown) when the headset 36 is being worn, and the test camera 53 is directed (or aimed) towards the mouth of the respective user. The NTE display 50 may be adjustably suspended from or connected to the earphones 46 by an NTE arm 54 such that the display 50 may be positioned directly in front of an eye of the respective user while the headset 36 is being worn, as is commonly understood. The earphones 46, the microphone 48, the NTE display 50, the test speaker 52, and the test camera 53 may be in operable communication with the communications radio 30 and/or the avionics system, as described below.

As shown in FIG. 1, the flight system 24 includes a runway awareness and advisory system (RAAS) 55, an instrument landing system (ILS) 56, a flight director 58, a weather data source 60, a terrain avoidance warning system (TAWS) 62, a traffic and collision avoidance system (TCAS) 64, a plurality of sensors 66 (e.g., a barometric pressure sensor, a thermometer, and a wind speed sensor), one or more terrain databases 68, one or more navigation databases 70, a navigation and control system (or navigation computer) 72, and a processor 74. The various components of the flight system 24 are in operable communication via a data bus 76 (or avionics bus). Although not illustrated, the navigation and control system 72 may include, amongst other components, a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear).

The processor (or processing system) 74 may be any one of numerous known general-purpose controllers or an application specific processor that operates in response to program instructions, such as field programmable gate arrays (FPGAs), application specific integrated circuits (ASICs), discrete logic, microprocessors, microcontrollers, and digital signal processors (DSPs), or combinations thereof. In the depicted embodiment, the processor 74 includes on-board RAM (random access memory) 78 and on-board ROM (read only memory) 80. The program instructions that control the processor 74 may be stored in either or both the RAM 78 and the ROM 80. For example, the operating system software may be stored in the ROM 80, whereas various operating mode software routines and various operational parameters may be stored in the RAM 78. The RAM 78 and/or the ROM 80 may include instructions stored thereon for carrying out the methods and processes described below. It will be appreciated that this is merely exemplary of one scheme for storing operating system software and software routines, and that various other storage schemes may be implemented. It will also be appreciated that the processor 74 may be implemented using various other circuits, not just a programmable processor. For example, digital logic circuits and analog signal processing circuits could also be used.

During operation of the aircraft 20, the first headset 34 is worn by the first user 38 and the second headset 36 is worn by the second user 40. The avionics system (or more specifically the processor 74) is configured to be at least partially operated using voice commands spoken by the users 38 and 40, as is commonly understood in the art. The voice commands spoken by the users 38 and 40 are received (or detected) by the microphones 48 on the respective headsets 34 and 36 which generate voice command signals that are representative of the received voice commands. The voice command signals are provided to the avionics system which utilizes them as described below.

According to one aspect of the present invention, the avionics system is provided with a voice command confirmation system. The confirmation system performs relatively low level hazard functions solely in response to receiving voice command for such functions but requires that a "confirmation condition" be detected before performing higher level hazard functions.

As one example, the first user 38 (wearing the first headset 34) speaks a voice command for a relatively minor and non-hazardous avionics system function (e.g., levels D or E on the DO-178 software guidance), such as related to the operation of a seat heater on the flight deck 12 (e.g., "seat heater on"). The microphone 48 on the first headset 34 receives the voice command, generates a representative voice command signal, and provides the signal to the avionics system. The processor 74, using the voice recognition software, determines that the received voice command is for a low level function. As such, the system 24 performs the functions without any additional confirmation. Although in some embodiments, the system may generate a command log of all detected voice commands and display the log on one of the display devices 28 so that the users 38 and 40 may review the commands.

However, if the first user 38 speaks a voice command for a higher level function (e.g., levels A, B, or C on the DO-178), such as related to the position of the landing gear (e.g., the retraction of the landing gear, such as "landing gear up"), the avionics system only performs the function after the detection of a confirmation condition. The confirmation condition may be that a second voice command that confirms the initial voice command has been received, or it may refer to the detection of a condition of the aircraft that indicates the desirability of that function at that time.

In the example of the first voice command requesting the retracting of the landing gear, the confirmation condition may be the avionics system receiving a second voice command from the second user 40 (or a representative signal from the respective microphone 48), indicating a confirmation of the initial voice command. The second, or confirmation, voice command may include one or more of the words from the initial voice command and an additional, confirmation word, such as "confirmed." Thus, an example of confirmation voice command for the initial voice command of "landing gear up" may be "landing gear up confirmed." In this example, upon recognizing the confirmation voice command, the avionics system allows the requested voice command (i.e., the function is performed). It should be noted, however, that a time limit may be placed on the confirmation. That is, in one embodiment, if the confirmation voice command is not received within a predetermined duration (e.g., five seconds) after receiving the initial voice command, the associated avionics system function is not performed.

In another embodiment using a confirmation voice command, a user provides both the initial voice command and the confirmation voice command. Such an embodiment may be useful when there is only one user (e.g., there is no co-pilot). After receiving the initial voice command (e.g., for a high level DO-178B function), the avionics system prompts the user for a confirmation. The prompting may be performed with a visual cue using one of the display devices 28 (FIG. 1) or an audible cue using the earphones 46 (FIG. 2). In such an embodiment, the confirmation voice command required by the user may also be a somewhat abbreviated form of the initial voice command. For an initial voice command of "landing gear up," a suitable confirmation voice command provided by the same user may be "gear confirmed."

As previously mentioned, the confirmation condition may also refer to a condition, or operational state, of the aircraft 20. Referring again to the example of the initial voice command being "landing gear up," the confirmation condition may be related to the altitude and/or airspeed of the aircraft 20 as detected by the altimeter and airspeed sensor. That is, after receiving the initial voice command, the avionics system does not retract the landing gear if the aircraft 20 is below an altitude threshold and/or above an airspeed threshold. In some embodiments, depending on the requested function and the operational state of the aircraft 20, the user(s) may be prompted for a confirmation voice command (in a manner similar to that described above) as an override.

Referring to FIG. 2, the test camera 53 may also be used to provide the confirmation condition, or an additional confirmation condition. The test camera 53 may be used to monitor the movements of the mouth or lips of the respective user. In the event that a high hazard avionics system function voice command is detected by the avionics system, the test camera 53 may be used to confirm that the respective user's mouth or lips have moved. After detecting such a voice command, if the avionics system, using motion detection software, determines that the mouth or lips of the user have not moved sufficiently for the user to speak such a command, the avionics system may prompt the user to give the voice command again (e.g., using one of the display devices 28 or the earphones 46) or simply ignore the command. Further, the avionics system may incorporate "lip reading" software in a similar fashion to confirm that the user's mouth or lips have moved in a manner consistent with the perceived voice command.

According to another aspect of the present invention, the avionics system is provided with the capability to perform tests to ensure that the voice command method and system described above is working properly. Referring to FIGS. 1 and 2, the avionics system includes various artificial (or test) voice commands (or representative signals) stored in memory (e.g., ROM 80). The system may automatically select one of the artificial voice commands at various times (e.g., every five minutes) to be used to test the voice command system. The selected test voice command (or representative signal) is provided to the test speaker 52 on the headset 34 (or headset 36) shown in FIG. 2. The test speaker 52 generates a test voice command which is detected by the microphone 48 in a manner similar to that described above. Upon detecting the test voice command, the microphone 48 generates an artificial voice command signal independently of the selection of the test voice command. The avionics system 24 (or the processor 74) then compares the selected test voice command to the artificial voice command received by the microphone 48 to determine whether or not the voice recognition software would recognize the two commands as being the same, as they are when the system is operating properly.

If the two voice commands are determined to be the same, the voice command functionality of the avionics system continues as described above. However, if the two commands to not match, it may be determined that the voice command system is not operating properly and subsequently be disabled.

In one embodiment, the test voice command is emitted from the test speaker 52 at a volume sufficiently low that the user would not be able to hear it though the earphones 46. It should also be noted that the microphone 48/speaker 52 combination used may be similar to a dual microphone "noise cancellation" system, although it is not necessarily shown as such. In other embodiments, the microphone 48/speaker 52 combination may be located elsewhere on the flight deck 22 (i.e., not on the headsets 34 or 36) and be used to test parts of the system other than the headsets (e.g., a single crewperson flight deck).

One advantage is that the system may automatically differentiate between avionics system functions having different hazard levels and perform relatively low hazard functions after receiving a single voice command, while requiring a second, confirmation condition before performing higher hazard functions. Another advantage is that because the system is provided with the capability to test the accuracy of the voice recognition software, the likelihood that an erroneous command will be performed by the system is further reduced. As a result, the method and system may allow voice commands to be used for critical avionics system functions, while meeting the standards set by the appropriate regulatory authorities. A further advantage is that the method and system allow the flight crew to interact and enter avionics system commands in a manner consistent with modern flight deck procedures.

It should be understood that other confirmation conditions may be used, such as other types of non-verbal inputs (e.g., the press of a button in response to a prompt generated by the system). The methods and systems described above may be utilized on vehicles other than aircraft, such as land vehicles, watercraft, and unmanned vehicles, or in the absence of vehicular platforms. Although the embodiment shown in the drawings incorporates a headset, it should be understood that the methods and system described herein may also be used on other head-worn headset devices, such as helmets, goggles, or ear-supported devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an avionics system comprising:
   receiving a first voice command indicative of a request to perform a first type of avionics system function;
   performing the first type of avionics system function in response to the receiving of the first voice command;
   receiving a second voice command indicative of a request to perform a second type of avionics system function, the second type of avionics system function having a hazard level that is higher than that of the first type of avionics system function; and
   performing the second type of avionics system function in response to the receiving of the second voice command only after a condition is detected that is indicative of a confirmation of the request to perform the second type of avionics function,
   wherein the second voice command comprises at least one second voice command word and the confirmation voice command comprises the at least one second voice command word and a confirmation voice command word.

2. The method of claim 1, wherein the condition indicative of the confirmation of the request to perform the second type of avionics function comprises receiving a confirmation voice command indicative of the confirmation of the request to perform the second type of avionics function.

3. The method of claim 2, wherein the second voice command is spoken by a first user and the confirmation voice command is spoken by a second user.

4. The method of claim 3, wherein the performing of the second type of avionics system function occurs only if the confirmation voice command is received within a predetermined amount of time after the receiving of the second voice command.

5. The method of claim 2, wherein second voice command and the confirmation voice command are spoken by a single user and further comprising prompting the single user for the confirmation voice command after the receiving of the second voice command.

6. The method of claim 1, wherein the condition indicative of the confirmation of the request to perform the second type of avionics function comprises an operational state of an aircraft in which the avionics system is installed.

7. An avionics system comprising:
   at least one microphone configured to detect voice commands and generate voice command signals representative thereof; and
   a processing system in operable communication with the microphone, the processing system being configured to:
      receive a first voice command signal from the at least one microphone, the first voice command signal being indicative of a request to perform a first type of avionics system function;
      perform the first type of avionics system function in response to said receiving the first voice command signal;
      receive a second voice command signal from the at least one microphone, the second voice command signal being indicative of a request to perform a second type of avionics system function, the second type of avionics system function having a hazard level that is higher than that of the first type of avionics system function; and
      perform the second type of avionics system function in response to said receiving the second voice command only after a condition is detected that is indicative of a confirmation of the request to perform the second type of avionics function,
   wherein the second voice command comprises at least one second voice command word and the confirmation voice command comprises the at least one second voice command word and a confirmation voice command word.

8. The avionics system of claim 7, wherein the condition indicative of the confirmation of the request to perform the second type of avionics function comprises receiving a confirmation voice command signal from the at least one microphone, the confirmation voice command signal being indicative of the confirmation of the request to perform the second type of avionics function.

9. The avionics system of claim 8, wherein the first, second, and confirmation voice command signals are generated by the at least one microphone upon receiving respective first, second, and confirmation voice commands.

10. The avionics system of claim 9, wherein the at least one microphone comprises first and second microphones, and the second voice command is received by the first microphone and the confirmation voice command is received by the second microphone.

11. The avionics system of claim 10, wherein the processing system is further configured such that the performing of the second type of avionics system function occurs only if the confirmation voice command signal is received within a predetermined amount of time after the receiving of the second voice command signal.

12. The avionics system of claim 9, wherein the second voice command and the confirmation voice command are received by a single microphone and wherein the processing system is further configured to generate a prompt for the confirmation voice command after the receiving of the second voice command signal.

13. The avionics system of claim 7, further comprising a speaker in operable communication with the processing system and being configured to generate an artificial voice command that is detectable by the at least one microphone and wherein the processing system is further configured to:
  provide the speaker with a test voice command signal such that the speaker generates the artificial voice command;
  receive an artificial voice command signal from the at least one microphone; and
  compare the test voice command signal with the artificial voice command signal.

14. An avionics system comprising:
  a speaker configured to generate an artificial voice command;
  a microphone configured to detect the artificial voice command and generate an artificial voice command signal representative thereof; and
  a processing system in operable communication with the speaker and the microphone, the processing system being configured to:
    provide the speaker with a test voice command signal such that the speaker generates the artificial voice command;
    receive the artificial voice command signal from the microphone; and
    compare the test voice command signal with the artificial voice command signal.

15. The avionics system of claim 14, wherein the processing system is further configured to:
  receive a first voice command signal from the microphone, the first voice command signal being generated by the microphone in response to receiving a first voice command indicative of a request to perform a first type of avionics system function; and
  perform the first type of avionics system function in response to said receiving the first voice command signal based on the comparing the test voice command signal with the artificial command signal.

16. The avionics system of claim 15, further comprising a headset configured to be worn by a user and wherein the speaker and the microphone are coupled to the headset.

17. The avionics system of claim 16, wherein the processing system is further configured to:
  receive a second voice command signal from the microphone, the second voice command signal being indicative of a request to perform a second type of avionics system function, the second type of avionics system function having a hazard level that is higher than that of the first type of avionics system function; and
  perform the second type of avionics system function in response to the receiving the second voice command based on the comparing the test voice command signal with the artificial command signal only after a condition is detected that is indicative of a confirmation of the request to perform the second type of avionics function.

18. The avionics system of claim 17, wherein the condition indicative of the confirmation of the request to perform the second type of avionics function comprises receiving a confirmation voice command indicative of the confirmation of the request to perform the second type of avionics function and wherein the second voice command comprises at least one second voice command word and the confirmation voice command comprises the at least one second voice command word and a confirmation voice command word.

* * * * *